United States Patent [19]

Chatterjee et al.

[11] Patent Number: 5,236,648
[45] Date of Patent: Aug. 17, 1993

[54] METHOD OF MANUFACTURING A REFERENCE MEMBER FOR CALIBRATING TONER CONCENTRATION MONITORS IN ELECTROPHOTOGRAPHIC DOCUMENT PRODUCTION APPARATUS

[75] Inventors: Dilip K. Chatterjee; Matthias H. Regelsberger, both of Rochester, N.Y.

[73] Assignee: Eastman Kodak Company, Rochester, N.Y.

[21] Appl. No.: 770,389

[22] Filed: Oct. 3, 1991

[51] Int. Cl.$^5$ .............................................. B29C 67/02
[52] U.S. Cl. ................... 264/122; 252/62.54; 264/162; 264/319; 264/349
[58] Field of Search ............. 264/24, 109, 122, 126, 264/319, 349, 162; 425/78; 252/62.54

[56] References Cited

U.S. PATENT DOCUMENTS

| | | |
|---|---|---|
| 3,923,946 | 12/1975 | Meyer .............................. 264/122 |
| 4,285,825 | 8/1981 | Isobe et al. ..................... 252/62.54 |
| 4,358,419 | 11/1982 | Byrne et al. ..................... 264/122 |
| 4,620,933 | 11/1986 | Ochiai et al. ................... 252/62.54 |
| 4,627,959 | 12/1986 | Gilman et al. .................. 264/122 |
| 4,919,858 | 4/1990 | Newton et al. .................. 264/122 |

Primary Examiner—Jeffery Thurlow
Assistant Examiner—Mathieu Vargot
Attorney, Agent, or Firm—David A. Howley

[57] ABSTRACT

A toner concentration reference member which shows substantially no temperature effects is manufactured by a process employing the milling of ferrite particles together with the epoxy beads for several hours without using any solvent. After milling, the dry mixture is pressed in a powder press into pallet form. The still fragile, pressed reference members are removed from the press and baked at elevated temperatures to induce the epoxy to thermally set. With baking, the reference members become mechanically stable and durable and, thus, easy to handle.

16 Claims, 3 Drawing Sheets

| BEFORE SURFACE POLISH: | SET #1 | | SET #2 | |
|---|---|---|---|---|
| | A-SIDE | B-SIDE | A-SIDE | B-SIDE |
| SAMPLE SIZE n | 20 | 20 | 20 | 20 |
| MEAN $V_{mon}$ (VOLT) | 3.401 | 3.298 | 3.198 | 3.170 |
| STD. DEV. $\sigma V_{mon}$ (VOLT) | 0.077 | 0.413 | 0.073 | 0.080 |

| AFTER SURFACE POLISH: | SET #1 | | SET #2 | |
|---|---|---|---|---|
| | A-SIDE | B-SIDE | A-SIDE | B-SIDE |
| SAMPLE SIZE n | 20 | 20 | 20 | 20 |
| MEAN $V_{mon}$ (VOLT) | 3.367 | 3.378 | 3.299 | 3.271 |
| STD. DEV. $\sigma V_{mon}$ (VOLT) | 0.097 | 0.093 | 0.073 | 0.054 |

METHOD OF MANUFACTURING A REFERENCE MEMBER FOR CALIBRATING TONER CONCENTRATION MONITORS IN ELECTROPHOTOGRAPHIC DOCUMENT PRODUCTION APPARATUS

CROSS REFERENCE TO RELATED APPLICATION

This application is related to commonly assigned U.S. patent application Ser. No. 07/632,677, filed in the names of A. S. Kroll and W. Chang on Dec. 24, 1990, now U.S. Pat. No. 5,192,972.

BACKGROUND OF THE INVENTION

Technical Field

This invention relates generally to developer mix monitors for electrostatographic machines, and more particularly to compensation for temperature effects of toner monitors.

Background Art

With the development of four-color printers and duplicators, the need for accurate toner concentration control in all four stations arises. While slight density errors can generally be tolerated in mono-color or accent color machines, such density errors in full process color images result in hue shifts that are quite noticeable.

While separate toner monitors for each of the four development stations is possible, a more cost-effective implementation of a toner concentration control system is disclosed in commonly assigned U.S. patent application Ser. No. 07/632,677, filed in the names of A. S. Kroll and W. Chang on Dec. 24, 1990, now U.S. Pat. No. 5,192,972. The developer mix monitoring system disclosed by Kroll and Chang requires the use of only one toner monitor to measure the toner concentrations in each of four developer stations. An on-line nominal toner concentration reference member having a known magnetic permeability was used by Kroll and Chang to compensate for the significant temperature effects of the monitor itself under varying operating conditions.

While the nominal toner concentration reference member was found to be able to provide a relative toner concentration reference, its magnetic permeability tended to change with temperature. An absolute toner concentration signal cannot be achieved as long as the toner concentration reference member itself shows a significant drift with temperature.

DISCLOSURE OF INVENTION

Therefore, it is an object of the present invention to provide a toner concentration reference member and a manufacturing process for making such a member which shows substantially no temperature effects and is compatible with a cost-effective manufacturing process.

The manufacturing process employs the milling of ferrite particles together with the epoxy beads for several hours without using any solvent. After milling, the dry mixture is pressed in a powder press into pallet form. The still fragile, pressed reference members are removed from the press and baked at elevated temperatures to induce the epoxy to thermally set. With baking, the reference members become mechanically stable and durable and, thus, easy to handle.

The reference members show a very small temperature effect, which is significantly smaller than that of the toner monitor itself. Concentration gradients within the members due to settling of the mixed components under the influence of gravity typically found in a wet mixture are successfully avoided by employing a dry process.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Figure 1:
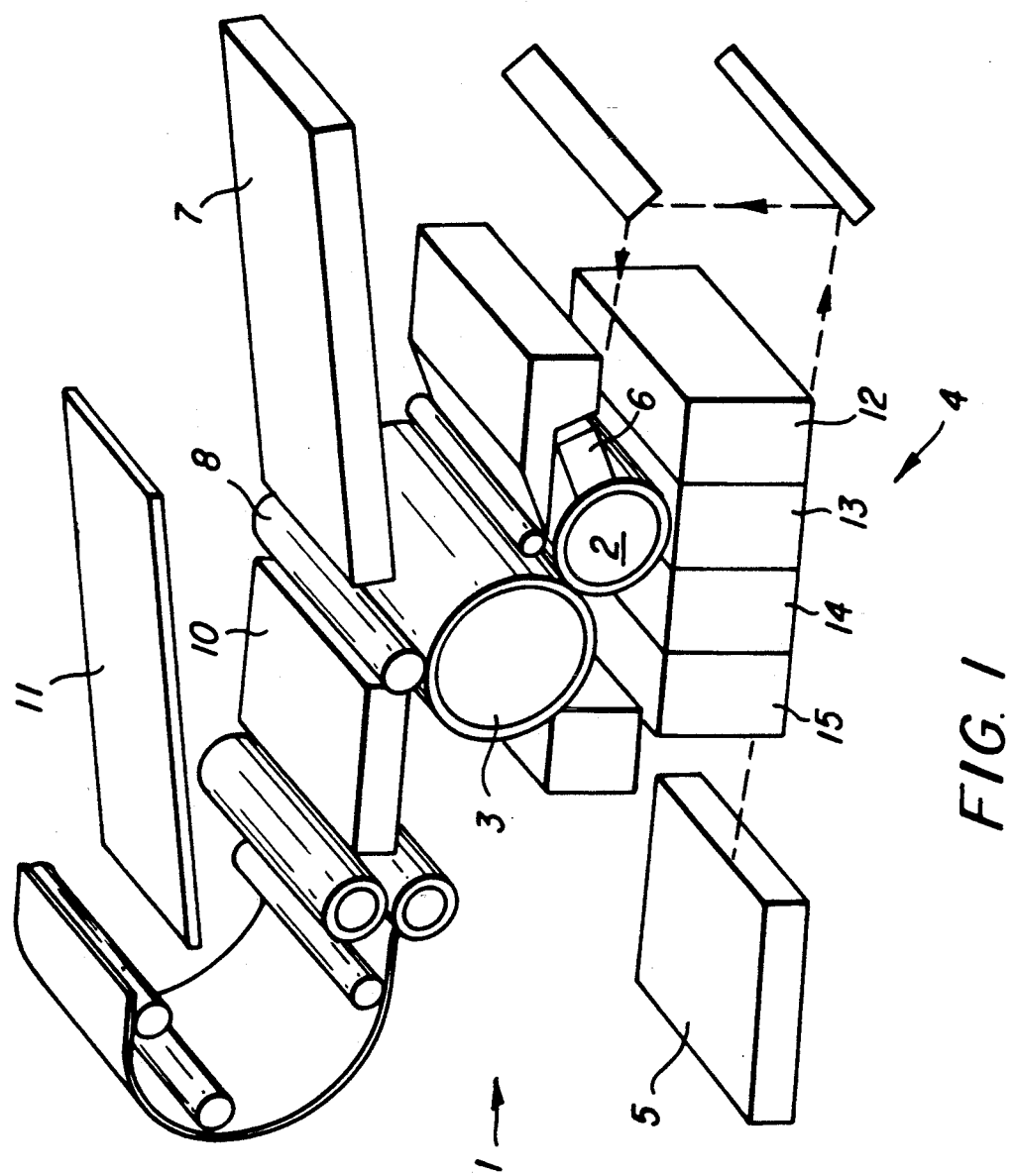
FIG. 1 is a front perspective view of an electrostatographic machine in which reference members according to the present invention are useful.

According to FIG. 1, an electrophotographic color printer 1 includes a photoconductive drum 2 mounted for rotation past a series of stations to create multicolor toner images on a transfer roller 3 or on a receiving sheet carried by transfer roller 3, according to a process well known in the art. More specifically, drum 2 is uniformly charged at a charging station 6, imagewise exposed at an exposure station, for example by a laser exposure station 5, to create a series of electrostatic images.

The electrostatic images are developed by a developing device 4, which applies a different color toner to each of the series of images to form a series of different color toner images. The series of toner images are then transferred in registration to a surface associated with transfer roller 3 to create a multicolor toner image. The surface associated with roller 3 can either be the surface of transfer roller 3 or the outside surface of a receiving sheet secured to the surface of roller 3. If the multicolor image is formed directly on the surface of transfer roller 3, it is best utilized by being transferred to a receiving sheet from a supply 7 at a position 8 remote from drum 2. The transferred image is fused at 10, and the finished sheet is stacked at 11.

A series of four development units 12-15 are moved through a development position allowing each of the electrostatic images to be toned by a different developing unit but using only a single developing position associated with drum 2.

According to FIG. 1, the development units are all fixed in a laterally movable carriage supported on guide rails, not shown, for linear movement in a horizontal direction below drum 2.

Figure 2:
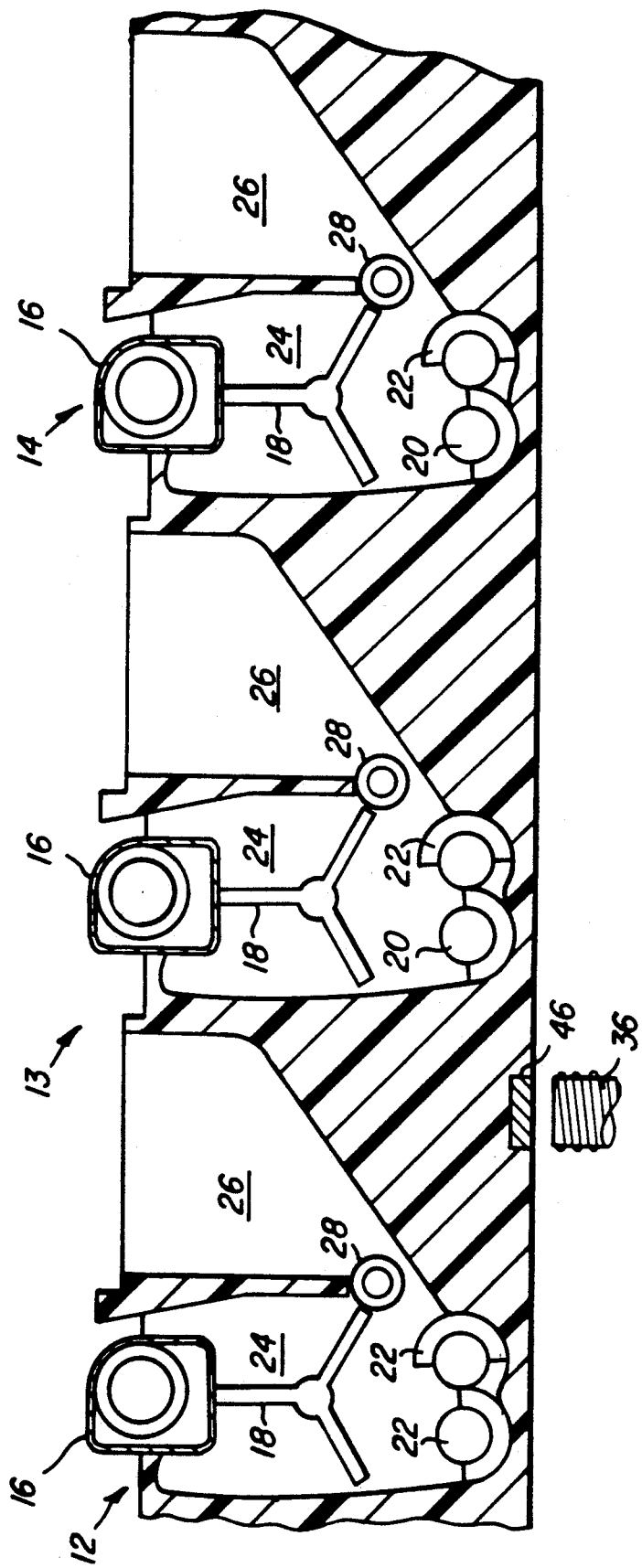
FIG. 2 is a rear cross-sectional view of a more detailed showing of a development device usable in the electrostatographic machine shown in FIG. 1.

Referring to FIG. 2, a developing unit 12 includes an applicator 16 and a mixing device such as paddle 18 and augers 20, 22. The mixing device is located in a development chamber 24 which contains a mixture of hard magnetic carrier particles and insulating toner particles. A supply of toner particles is contained in a toner chamber 26. Toner particles are fed from toner chamber 26 to development chamber 24 by a toner feed roller 28.

In operation, rotation of paddle 18 and augers 20, 22 cause both the mixing of developer in chamber 24 and a raising of the level of that developer making it accessible to the magnetic field of applicator 16. Applicator 16 includes a rotatable magnetic core 30 and a stationary sleeve 32. Hard magnetic carrier particles move around the sleeve in response to rotation of the core bringing the developer through the developing position. The developer is moved by the rotating core at essentially the same speed as the electrostatic image is moving on rotating drum 2 providing high quality development of the electrostatic image.

A plurality of development units 12-15, which are of essentially the same construction, form development device 4 of FIG. 1. After development of a first electrostatic image, a motor, not shown, is actuated to drive developing device 4 to the right, as illustrated, until applicator 16 of developing unit 13 becomes aligned with the exposure position for toning a second electrostatic image. The process is repeated for developing units 14 and 15. The motor is reversed after all four images have been toned, and toning device 4 is returned to the left to its original position.

A toner monitor 36 is provided in a fixed position below toning device 4 such that the developing unit 12-15 which is at the developing position of drum 2 is aligned with the monitor. Toner monitor 36 may be chosen from several commercially available products, such as, for example, those responsive to changes in effective permeability of two component developers and manufactured by Hitachi Metals, Ltd. Toner monitor 36 emits an analog signal which is representative of the permeability in the developer mix, and thus representative of the toner concentration.

As set forth above, variables associated with the measurement of the toner concentration in development units 12-15 can interject error in the output of toner monitor 36. According to the present invention, means are provided for calibrating the toner monitor to compensate for such variables.

A reference member 46 having known permeability is positioned in developing device 4 such that member 46 aligns with toner monitor 36 as the developing device shifts between its positions aligning developing units 12 and developing units 13 with the developing position. FIG. 2 shows the developing device in its position aligning member 46 with the toner monitor. Member 46 simulates a nominal toner concentration to the toner monitor. During start up, the output signal of the toner monitor when aligned with member 46 is stored in memory in central processing unit 38 as a base value. From time-to-time during operation, the output signal of the toner monitor when aligned with member 46 is compared to the base value. Any difference between the output of the monitor and the base value is used to compensate future signals from the toner monitor accordingly.

Reference member 46 permits the detection of shifts of the output signal of the toner monitor caused by changing environment. The first reading for member 46 for each new development unit will be stored as a base value. The difference between the first reading and later readings will be added to or subtracted from the later reading of that station to compensate the output change of the sensor due to environment change.

In order to eliminate the temperature effects of the toner monitor, it is necessary for the reference member to have a stable, but not necessarily any particular (predefined) magnetic permeability. The permeability should, however, fall within the range of control voltages used to measure the permeability of the four developer mixtures.

In order to obtain such a reference member, a homogeneous dispersion of ferrite particles solidified in an epoxy matrix was ballmilled for several hours together with dry epoxy beads. The ferrite particles may be magnetized ferrite carrier such as undoped strontium ferrite $SrFe_{12}O_{19}$. In an experiment, a mill was loaded with 8 mm diameter zirconium dioxide $ZrO_2$ balls and the above-described strontium ferrite and epoxy mixture. After milling, the dry mixture was filled into a powder press and compacted under pressure of 5000 psi at room temperature into a disk of $\frac{5}{8}''$ diameter and $\frac{1}{8}''$ height. The disk was then cured at 70° C. for about 2.5 hours. This curing densified the compacts. In other experiments, it was found that large swings in curing temperature induced cracking and/or air pockets within or at the surface of the reference members.

Other experiments showed that a compacting pressure of about 3,000 psi resulted in low densification and high porosity, while a pressure of about 7,000 psi resulted in crumbling of the reference member. It was also found that curing temperatures of 60° C. was sufficient if the curing time was increased, and that curing temperatures of 80° C. was acceptable if the curing time was decreased.

A series of reference members with different loadings of strontium ferrite were prepared such that the ratio of the ferrite to epoxy was between 20% and 40% by weight. The toner monitor output voltage ($V_{MON}$) was measured at constant control voltage ($V_{CONTR}$) of ten volts. The results for the different loadings are plotted in FIG. 3, which is a graph showing the monitor output voltage as a function of ferrite-to-epoxy carrier concentration in the reference member.

Figures 3, 4:
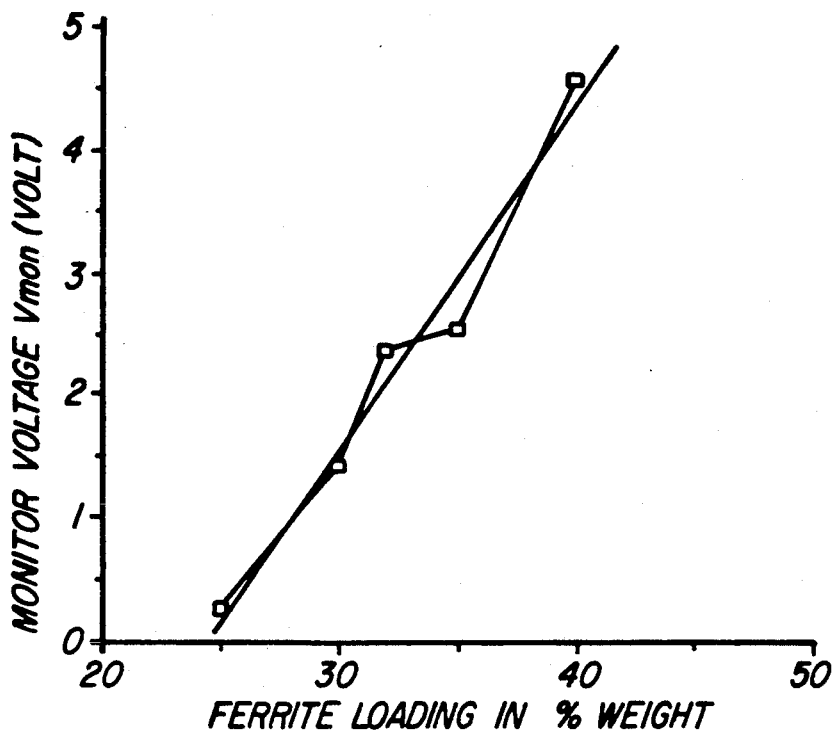
FIG. 3 is a graph showing monitor output voltage $V_{MON}$ as a function of ferrite-to-epoxy concentration in a reference member.
FIG. 4 is a table summarizing the results quantifying the uniformity of reference members.

Based on the data shown in FIG. 3, a ferrite loading of 35% was chosen for prototype reference members to give desired voltage response. Accordingly, two sets of 20 reference members were made at fixed ferrite loading of 35% by weight. The toner monitor voltages for both sides of all reference members were read and their distribution evaluated.

Since some of the reference members had a somewhat rough surface, or divots in their surfaces, the surfaces of almost all reference members were hand polished by using fine sandpaper. The statistical data of our evaluation quantifying the uniformity of the reference members is summarized in FIG. 4.

The data shows that the polishing of the reference member surfaces made the standard deviation $sV_{MON}$ significantly smaller for the B-sides of sets #1 and #2. These two sides showed various numbers of divots and cracks, which were removed by the polishing step. The A-sides of both sets were substantially better (no divots or cracks) for unknown reasons.

Overall, the data suggests that no concentration gradients of ferrite existed within the reference members, since after surface polishing both sides, each set of reference members yielded statistically identical monitor voltages ($V_{MON}$).

However, the two sets of reference members are statistically different with respect to their monitor voltage response. This suggests that the manufacturing process has a batch-to-batch variation, which is statistically significant. However, the reference members are only expected to produce a temperature stable monitor reading and not any predefined monitor reading, so the batch-to-batch variations are without consequences as long as the monitor reading is within the range of the readings for the four developer mixtures. Similarly, surface imperfections of the reference members do affect the toner monitor response and have to be controlled and minimized.

The temperature sensitivity (i.e., stability) of the reference members can be tested by storing them for at least 14 hours at elevated temperatures of about 54° C. Upon removal from the oven, a warm reference member is quickly placed on a toner monitor which has been kept at room temperature, and the monitor output voltage is recorded in one minute intervals. In experiments, a drop in monitor voltage was observed for about ten minutes until the monitor voltage stabilized.

Differences in monitor voltage readings taken at $t=0$ minutes and $t=10$ minutes is interpreted as temperature stability of the reference members. The average temperature stability of our tests is $0.056 \pm 0.021$ volts. With a mean oven temperature of 54° C. (24° C. above ambient), the temperature coefficient (TC) of the reference members is estimated to be:

$$TC = 2.4 \pm 0.9 \ mV/°C.$$

This temperature coefficient is roughly 1/6th of that measured for the toner monitor itself over the same temperature range.

The experimental evaluation of prototype reference members suggests that the manufacturing process of the present invention yields reference members of good uniformity. Concentration gradients of ferrite and epoxy particles could not be found. In particular, both surfaces of the reference members gave identical toner monitor readings, making the handling and insertion of the reference members into the developer station a simple matter since orientation is not a concern.

The temperature sensitivity of the reference members was found to be substantially smaller than the temperature sensitivity of toner monitors themselves. With this experimental result, the toner concentration monitoring system is indeed capable of reducing the rather large temperature-induced uncertainty in toner concentration measurements by providing an (almost) temperature independent reference reading.

The invention has been described in detail with particular reference to preferred embodiments thereof, but it will be understood that variations and modifications can be effected within the spirit and scope of the invention. For example, in order to avoid the costly surface finishing step of the reference members, the powder press can be coated with a release agent which is either permanently applied to the form or prior to each pressing cycle. The easy separation of the still fragile powder members would ensure the desired smooth surface. Further, the small temperature effect observed in the prototype members could be further reduced by selecting different epoxies in conjunction with different milling times.

What is claimed is:

1. A method for manufacturing a toner concentration reference member having a stable magnetic permeability for simulating a nominal toner concentration to a development mixture toner monitor for electrostatographic apparatus, said method comprising the steps of:
    milling a dry mixture of ferrite particles and epoxy beads without solvent;
    forming the milled mixture into a pallet; and
    baking the pallet at a temperature in a range between about 60-80 degrees Celsius to eliminate ferrite concentration gradients until the epoxy is thermally set to thereby form the toner concentration reference member.

2. The method defined in claim 1 wherein the forming step includes pressing the dry mixture to form a pallet.

3. The method defined in claim 2 wherein the pressing is conducted between about 3000 psi and about 7000 psi.

4. The method defined in claim 2 wherein the pressing is conducted at about 5000 psi.

5. The method defined in claim 1 wherein the particles are magnetized.

6. The method defined in claim 1 wherein the particles are strontium ferrite.

7. The method defined in claim 1 wherein said mixture is a homogeneous dispersion of ferrite particles solidified in an epoxy matrix.

8. The method defined in claim 7 wherein said mixture concentration is between about 20% and 40% ferrite by weight.

9. The method defined in claim 7 wherein said mixture concentration is about 35% ferrite by weight.

10. The method defined in claim i wherein said milling step is performed until the dry mixture is a substantially homogeneous distribution of ferrite particles and epoxy beads.

11. The method defined in claim 1 wherein said milling step is performed for several hours.

12. The method defined in claim 1 wherein said milling step is performed for at least ten hours.

13. The method defined in claim 1 wherein said baking step is performed at about 70° C.

14. The method defined in claim 1 further comprising the step of minimizing surface imperfections on said member.

15. The method defined in claim 1 wherein said epoxy is thermally curable.

16. A method for manufacturing an orientation-insensitive toner concentration reference member having a stable magnetic permeability for simulating a temperature-fluctuation insensitive nominal toner concentration to a development mixture toner monitor for electrostatographic apparatus, said method comprising the steps of:
    milling a dry mixture of ferrite particles and thermally settable epoxy beads without solvent;
    forming the milled mixture into a pallet; and
    baking the pallet at a temperature below a temperature at which said epoxy beads would become fluid in a range between about 60-80 degrees Celsius to eliminate ferrite concentration gradients until the epoxy is thermally set to thereby form the toner concentration reference member.

* * * * *